United States Patent
Murayama et al.

(10) Patent No.: US 6,297,351 B1
(45) Date of Patent: Oct. 2, 2001

(54) POLYBENZOXAZOLE RESIN AND PRECURSOR THEREOF

(75) Inventors: Mitsumoto Murayama; Toshimasa Egucih, both of Yokohama; Takashi Yamaji, Fujieda; Takuya Hatao; Nobuhiro Higashida, both of Kawasaki; Yoko Mizumoto, Susono, all of (JP)

(73) Assignee: Sumitomo Bakelite Company Limited, Tokyo (JP)

( * ) Notice: Subject to any disclaimer, the term of this patent is extended or adjusted under 35 U.S.C. 154(b) by 0 days.

(21) Appl. No.: 09/465,004

(22) Filed: Dec. 16, 1999

(30) Foreign Application Priority Data

Dec. 17, 1998 (JP) ................................. 10-359561
Dec. 22, 1998 (JP) ................................. 10-365684
Dec. 22, 1998 (JP) ................................. 10-365685
Dec. 22, 1998 (JP) ................................. 10-365686

(51) Int. Cl.$^7$ ................................. C08G 73/24
(52) U.S. Cl. ................ 528/401; 528/176; 528/272; 528/332; 528/397; 528/422
(58) Field of Search .................. 528/401, 176, 528/272, 332, 397, 422

(56) References Cited

U.S. PATENT DOCUMENTS 6,114,497 * 9/2000 Tada et al. ................ 528/401

FOREIGN PATENT DOCUMENTS 62-207332    9/1987   (JP) .
63-318       1/1988   (JP) .

OTHER PUBLICATIONS

Chem Abstract: 133:59282 "Polybenzoxazole . . . therefrom" Eguchi et al. Jul. 2000.*
133:74777 "Polybenzoxazole . . . dielectric constant" Yamagi et al Jun. 2000.*
133:5133 "Hydroxy containing polyamides . . . devices" Eguchi et al May 2000.*
133:5407 "Polybenzonazole . . . Water resistance" Yamagi et al May 2000.*
133:5406 "Polybenzoxazole . . . Water resistance" Tada et al. May 2000.*
132:32287 "Hydroxy containing polyamides . . . polybenzoxazoles" Eguchi et al. May 2000.*
132:322286 "Hydroxy containing polyamides . . .polybenzoxazoles".*
Murayama et al. May 2000.*
122:134019 Fluonnsta poly (benzoxazole–imodes) Brunea et al 1995.*
122:16855 Novel thermooxidatively . . . poly (ester–amide–benzoxazole) Sunstar et al 1995.*
121:96201 Polybenzoxazole liquid crystal alignment films Yusa et al 1994.*

* cited by examiner

Primary Examiner—Duc Truong
(74) Attorney, Agent, or Firm—Smith, Gambrell & Russell LLP

(57) ABSTRACT

A polybenzoxazole precursor having recurring units represented by the following general formula (1) and a polybenzoxazole resin having a structure obtained by cyclizing the polybenzoxazole precursor:

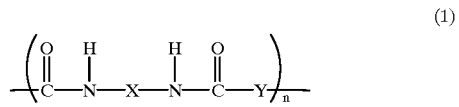

(1)

wherein n denotes an integer of 1–1000, and (i) when X is selected from bivalent aromatic groups represented by the general formulas (2)–(4) defined in the specification each having two OR groups (Rs each denotes H or a monovalent organic group and may be the same or different), and the amide group in the formula (1) and the OR group respectively bond to the adjacent carbon atoms of the aromatic group, Y denotes a bivalent organic group containing fluorine; and (ii) when Y is selected from bivalent aromatic groups represented by the general formulas (5)–(7) defined in the specification, X denotes a bivalent aromatic group containing fluorine and having two OR groups (Rs each denotes H or a monovalent organic group and may be the same or different), and the amide group in the formula (1) and the OR group respectively bond to the adjacent carbon atoms of the aromatic group.

4 Claims, No Drawings

POLYBENZOXAZOLE RESIN AND PRECURSOR THEREOF

BACKGROUND OF THE INVENTION

1. Field of the Invention

The present invention relates to polybenzoxazole resins which are excellent in electrical characteristics, thermal characteristics, and mechanical characteristics, and which are usable as layer insulation films and protective films for semiconductors, layer insulation films of multilayer circuits, cover coats of flexible copper-clad sheets, solder resist films, liquid crystal-aligned films, etc.

2. Related Art Statement

Among the characteristics required for insulation materials for semiconductors, electric characteristics, particularly, dielectric constant and heat resistance are most important characteristics. In order to allow these two characteristics to be compatible with each other, organic insulation films of high heat resistance are expected. For example, inorganic insulation films such as silicon dioxide which have hitherto been used, have a high heat resistance, but are high in dielectric constant, and the two characteristics are hardly compatible with each other. Organic insulation films represented by polyimide resins are excellent in electric characteristics and heat resistance and have compatibility in the two characteristics, and are actually used as solder resists, cover layers, liquid crystal-aligned films, and the like.

However, with recent enhancement in function and performance of semiconductors, remarkable improvement of electric characteristics and heat resistance is needed, and resins of further higher performances are demanded. Particularly, those materials are expected which have a low dielectric constant of 3.0 or lower and which have a glass transition point (Tg) of 400° C. or higher. As to polyimide resins, it has been also attempted to attain the above properties, for example, by introducing fluorine and trifluoromethyl group into the high molecules, but at present the properties have not yet reached the desired level.

Among resins other than polyimide resins, polybenzoxazole resins are expected. The presence of two carboxyl groups in the imide ring of polyimide resins adversely affect electric characteristics. In general polybenzoxazole resins are essentially superior to polyimide resins in electric characteristics, and hence it is easy to allow heat resistance and dielectric constant to be compatible with each other. However, the level of electric characteristics required is very high and the conventional polybenzoxazole resins have not reached the required level.

OBJECT AND SUMMARY OF THE INVENTION

The object of the present invention is to solve the above problems and provide resins excellent in electric characteristics and heat resistance.

As a result of intensive research conducted in an attempt to solve the above problems, the inventors have found a polybenzoxazole precursor having recurring units represented by the following general formula (1), and a polybenzoxazole resin having a structure obtained by cyclizing said polybenzoxazole precursor, and have accomplished the present invention.

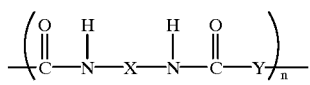

(1)

According to the first embodiment, in the above formula (1), n denotes an integer of 1–1000, X is selected from bivalent aromatic groups represented by the following general formulas (2)–(4) each having two OR groups (Rs each represents H or a monovalent organic group and may be the same or different), the amide group in the formula (1) and said OR group respectively bond to the adjacent carbon atoms of the aromatic group, and Y denotes a bivalent organic group containing fluorine.

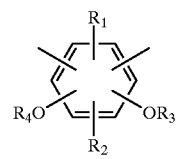

(2)

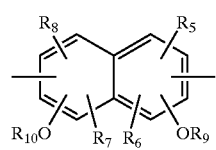

(3)

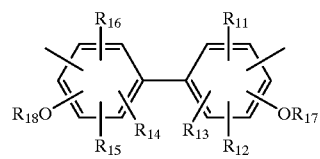

(4)

In the formulas (2)–(4), $R_1$, $R_5$ and $R_{11}$ each denotes F or a monovalent organic group containing fluorine, $R_2$, $R_6$, $R_7$, $R_8$, $R_{12}$, $R_{13}$, $R_{14}$, $R_{15}$ and $R_{16}$ each denotes H, F or a monovalent organic group containing fluorine and may be the same or different, $R_3$, $R_4$, $R_9$, $RP_{10}$, $R_{17}$ and $R_{18}$ each denotes H or a monovalent organic group and may be the same or different.

According to the second embodiment, in the formula (1), n denotes an integer of 1–1000, Y is selected from bivalent aromatic groups represented by the following general formulas (5)–(7), and X denotes a bivalent aromatic group containing fluorine and having two OR groups (Rs each denotes H or a monovalent organic group and may be the same or different), and the amide group in the formula (1) and the OR group respectively bond to the adjacent carbon atoms of the aromatic group.

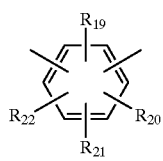

(5)

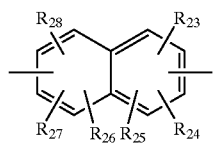

(6)

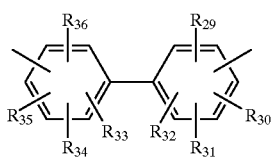

(7)

In the formulas (5)–(7), $R_{19}$, $R_{23}$ and $R_{29}$ each denotes F or a monovalent organic group containing fluorine, and $R_{20}$, $R_{21}$, $R_{22}$, $R_{24}$, $R_{25}$, $R_{26}$, $R_{27}$, $R_{28}$, $R_{30}$, $R_{31}$, $R_{32}$, $R_{33}$, $R_{34}$, $R_{35}$ and $R_{36}$ each denotes H, F or a monovalent organic group containing fluorine and may be the same or different.

DETAILED DESCRIPTION OF THE INVENTION

The polybenzoxazole precursor of the present invention can be obtained from a dicarboxylic acid and a bisaminophenol compound or a diaminodihydroxy compound or a derivative thereof such as an esterification product or an etherification product by acid chloride method, active ester method or condensation reaction method in the presence of a dehydration condensation agent such as polyphosphoric acid or dicyclohexylcarbodiimide.

As examples of diaminodihydroxy compounds used in the present invention and particularly constituting the formula (2), mention may be made of 1,3-diamino-4,6-dihydroxydifluorobenzene, 1,4-diamino-3,6-dihydroxydifluorobenzene, 1,4-diamino-2,3-dihydroxydifluorobenzene, 1,2-diamino-3,6-dihydroxydifluorobenzene, 1-trifluoromethyl-2,4-diamino-3,5-dihydroxybenzene, 1-trifluoromethyl-2,5-diamino-3,6-dihydroxybenzene, 1-trifluoromethyl-2,4-diamino-3,5-dihydroxyfluorobenzene, 1-trifluoromethyl-2,5-diamino-3,6-dihydroxyfluorobenzene, 1,4-bis(trifluoromethyl)-2,5-diamino-3,6-dihydroxybenzene, 1-pentafluoroethyl-2,5-diamino-3,6-dihydroxybenzene, 1-perfluorocyclohexyl-2,5-diamino-3,6-dihydroxybenzene, 1,3-diamino-4,6-diethoxydifluorobenzene, and derivatives thereof such as ester compounds and ether compounds. The diaminodihydroxy compounds are not limited to these examples. These compounds can be used each alone or in combination.

As examples of diaminodihydroxy compounds used in the present invention and particularly constituting the formula (3), mention may be made of 2,7-diamino-3,6-dihydroxytetrafluoronaphthalene, 2,6-diamino-3,7-dihydroxytetrafluoronaphthalene, 1,6-diamino-2,5-dihydroxytetrafluoronaphthalene, 3,6-diamino-2,5-dihydroxytetrafluoronaphthalene, 2,7-diamino-1,8-dihydroxytetrafluoronaphthalene, 1-trifluoromethyl-3,6-diamino-2,7-dihydroxynaphthalene, 1,5-bis(trifluoromethyl)-3,7-diamino-2,6-dihydroxynaphthalene, 1-trifluoromethyl-3,6-diamino-2,5-dihydroxynaphthalene, 1-pentafluoroethyl-3,6-diamino-2,7-dihydroxynaphthalene, 1-perfluorocyclohexyl-3,6-diamino-2,7-dihydroxynaphthalene, 1,5-bis(trifluoromethyl)-3,7-diamino-2,6-dihydroxydifluoronaphthalene, 2,6-diamino-3,7-diethoxytetrafluoronaphthalene, 1,4,5,8-tetra-(trifluoromethyl)-2,7-diamino-3,6-dihydroxynaphthalene, and derivatives thereof such as ester compounds and ether compounds. The diaminodihydroxy compounds are not limited to these examples. These compounds can be used each alone or in combination.

As examples of bisaminophenol compounds used in the present invention and particularly constituting the formula (4), mention may be made of 4,4'-diamino-3,3'-dihydroxy-5,5'-trifluoromethylbiphenyl, 4,4'-diamino-3,3'-dihydroxy-5,5'-pentafluoroethylbiphenyl, 4,4'-diamino-3,3'-dihydroxy-6,6'-trifluoromethylbiphenyl, 4,4'-diamino-3,3'-dihydroxy-6,6'-pentafluoroethylbiphenyl, 3,3'-diamino-4,4'-dihydroxy-5,5'-trifluoromethylbiphenyl, 3,3'-diamino-4,4'-dihydroxy-5,5'-pentafluoroethylbiphenyl, 3,3'-diamino-4,4'-dihydroxy-6,6'-trifluoromethylbiphenyl, 3,3'-diamino-4,4'-dihydroxy-6,6'-pentafluoroethylbiphenyl, 3,4'-diamino-4,3'-dihydroxy-5,5'-trifluoromethylbiphenyl, 3,4'-diamino-4,3'-dihydroxy-5,5'-pentafluoroethylbiphenyl, 3,4'-diamino-4,3'-dihydroxy-6,6'-trifluoromethylbiphenyl, 3,4'-diamino-4,3'-dihydroxy-6,6'-pentafluoroethylbiphenyl, and derivatives thereof such as ester compounds and ether compounds. The bisaminophenol compounds are not limited to these examples. These compounds can be used each alone or in combination.

Examples of aromatic diaminodihydroxy compounds other than the above diaminodihydroxy compounds are 3,3'-diamino-4,4'-dihydroxybiphenyl, 4,4'-diamino-3,3'-dihydroxybiphenyl, 2,2-bis(3-amino-4-hydroxyphenyl)propane, 2,2-bis(4-amino-3-hydroxyphenyl)propane, 2,2-bis(3-amino-4-hydroxyphenyl)-hexafluoropropane, 2,2-bis(4-amino-3-hydroxyphenyl)-hexafluoropropane, 4,4'-bis(3-amino-4-hydroxyphenoxy)-octafluorobiphenyl, 4,4'-bis(4-amino-3-hydroxyphenoxy)octafluorobiphenyl, 2,2-bis(3-amino-4-hydroxy-5-trifluoromethylphenyl) hexafluoropropane, and derivatives thereof such as ester compounds and ether compounds. The compounds are not limited to these examples. In the present invention, the above compound containing no fluorine must be used in combination with the above compound containing fluorine. It is also possible to use two or more aromatic diaminodihydroxy compounds in combination. Furthermore, these compounds can be used in combination with the bisaminophenol compounds or diaminodihydroxy compounds constituting the formulas (2)–(4) as far as the performance of the resulting reins is not damaged.

As examples of the dicarboxylic acids used in the present invention, mention may be made of isophthalic acid, terephthalic acid, 3-fluoroisophthalic acid, 2-fluoroisophthalic acid, 3-fluorophthalic acid, 2-fluorophthalic acid, 2-fluoroterephthalic acid, 2,4,5,6-tetrafluoroisophthalic acid, 3,4,5,6-tetrafluorophthalic acid, 4,4'-hexafluoroisopropylidenediphenyl -1,1'-dicarboxylic acid, perfluorosuberic acid, 2,2'-bis(trifluoromethyl)-4,4'-biphenylenedicarboxylic acid, 4,4'-oxybisbenzoic acid, 2,3,4,6,7,8-hexafluoronaphthalene-1,5-dicarboxylic acid, 2,3,4,5,7,8-hexafluoronaphthalene-1,6-dicarboxylic acid, 1,3,4,5,7,8-hexafluoronaphthalene-2,6-dicarboxylic acid, 1-trifluoromethylnaphthalene-2,6-dicarboxylic acid, 1,5-bis(trifluoromethyl)naphthalene-2,6-dicarboxylic acid, 1-pentafluoroethylnaphthalene-2,6-dicarboxylic acid, 1-trifluoromethylnaphthalene-3,7-dicarboxylic acid, 1,5-bis(trifluoromethyl)naphthalene-3,7-dicarboxylic acid, 1-pentafluoroethylnaphthalene-3,7-dicarboxylic acid, 1-undecafluorocyclohexylnaphthalene-3,7-dicarboxylic acid, 1-trifluoromethyl-2,4,5,6,8-pentafluoronaphthalene-3,7-dicarboxylic acid, 1-bis(trifluoromethyl)methoxy-2,4,5,6,8-pentafluoronaphthalene-3,7-dicarboxylic acid, 1,5-bis(trifluoromethyl)-2,4,6,8-tetrafluoronaphthalene-3,7- dicarboxylic acid, and 1,5-bis[bis(trifluoromethyl) methoxy]-2,4,6,8-tetrafluoronaphthalene-3,7-dicarboxylic acid. The dicarboxylic acids are not limited to these examples. These acids can be used each alone or in combination. In the present invention, the dicarboxylic acid containing no fluorine must be used in combination with the dicarboxylic acid containing fluorine.

According to one example of preparation of the present polybenzoxazole precursor by the acid chloride method, first, the above dicarboxylic acid is reacted with an excess amount of thionyl chloride at a temperature of from room temperature to 75° C. in the presence of a catalyst such as N,N-dimethylformamide, followed by distilling off excess thionyl chloride by heating under reduced pressure. Then, the residue is recrystallized by use of a solvent such as hexane to obtain a dicarboxylic acid chloride which is an acid chloride. Then, the above bisaminophenol compound and/or diaminodihydroxy compound are dissolved usually in a polar solvent such as N-methyl-2-pyrrolidone, followed by carrying out reaction with the dicarboxylic acid chloride at a temperature of −30° C. to room temperature in the presence of an acid-acceptor such as pyridine. Thus, the polybenzoxazole precursor can be obtained.

The polybenzoxazole resin of the present invention can be obtained by subjecting the resulting polybenzoxazole precursor to cyclization reaction by heating or treating with a dehydrating agent in the conventional manner. If necessary, various additives such as surface active agents and coupling agents are added to the polybenzoxazole resin, and the resin can be used as layer insulation films and protective films for semiconductors, layer insulation films of multilayer circuits, cover coats of flexible copper-clad sheets, solder resist films, liquid crystal-aligned films, etc.

Furthermore, when at least one of Rs of the OR groups in X in the formula (1) is H, or when at least one of $R_3$ and $R_4$ in the formula (2) is H, at least one of $R_9$ and $R_{10}$ in the formula (3) is H, or at least one of $R_{17}$ and $R_{18}$ in the formula (4) is H, the precursor of the polybenzoxazole resin in the present invention can be used together with naphthoquinonediazide compounds as photosensitive agents to provide positive type photosensitive resin compositions, and when at least one of Rs of the OR groups in X in the formula (1) is a group having a photo-crosslinkable group such as methacryloyl group, or when at least one of $R_3$ and $R_4$ in the formula (2), at least one of $R_9$ and $R_{10}$ in the formula (3), or at least one of $R_{17}$ and $R_{18}$ in the formula (4) is a group having a photo-crosslinkable group such as methacryloyl group, the present precursor can be used together with photoinitiators to provide negative type photosensitive resin compositions.

The polybenzoxazole precursor of the present invention is normally used in the state of varnish by dissolving it in a solvent. Examples of the solvent are N-methyl-2-pyrrolidone, γ-butyrolactone, ∈-caprolactone, N,N-dimethylacetamide, dimethyl sulfoxide, diethylene glycol dimethyl ether, diethylene glycol diethyl ether, diethylene glycol dibutyl ether, propylene glycol monomethyl ether, dipropylene glycol monomethyl ether, propylene glycol monomethyl ether acetate, methyl lactate, ethyl lactate, butyl lactate, methyl-1,3-butylene glycol acetate, 1,3-butylene glycol-3-monomethyl ether, methyl pyruvate, ethyl pyruvate, and methyl-3-methoxy propionate. These can be used each alone or in admixture of two or more.

The polybenzoxazole precursor of the present invention can be used in the following manner. The precursor and the additives are dissolved in the above solvent, and the solution is coated on a suitable support such as glass, metal, silicon wafer and ceramic substrate. As the coating method, mention may be made of spin coating with a spinner, spray coating with a spray coater, dipping, printing, roll coating, etc. After formation of a coating film in this way, the film is preferably heat treated to convert it to a polybenzoxazole resin. Moreover, the precursor can be used as a polybenzoxazole resin soluble in a solvent by selecting the dicarboxylic acid component.

DESCRIPTION OF THE PREFERRED EMBODIMENT

The present invention will be explained specifically by way of the following examples. It should be understood that they are exemplary only, and should not be construed as limiting the present invention in any manner.

Preparation Examples of Acid Chlorides

Preparation Example 1

25.0 Grams of 4,4'-hexafluoroisopropylidenediphenyl-1, 1'-dicarboxylic acid, 45 ml of thionyl chloride and 0.5 ml of dried dimethylformamide (hereinafter referred to as "DMF") were charged in a reaction vessel, and their reaction was carried out at 60° C. for 2 hours in a nitrogen atmosphere. After completion of the reaction, the excess thionyl chloride was distilled off by heating under reduced pressure. The residue was recrystallized using dried hexane to obtain 21.3 g of 4,4'-hexafluoroisopropylidenediphenyl-1,1'-dicarboxylic acid chloride.

Preparation Example 2

19.6 Grams of 2,2'-bistrifluoromethyl-4,4'-biphenylenedicarboxylic acid chloride was obtained in the same manner as in Preparation Example 1, except that 24.1 g of 2,2'-bistrifluoromethyl-4,4'-biphenylenedicarboxylic acid was used in place of 25.0 g of 4,4'-hexafluoroisopropylidenediphenyl-1,1'-dicarboxylic acid used in Preparation Example 1.

Preparation Example 3

50 Grams of 1,2,3,5-tetrafluoro-4,6-dicyanobenzene was added to 250 g of 65% aqueous sulfuric acid. The former was dissolved by heating, and then the solution was heated for 3 hours under refluxing conditions. The precipitated crystal was subjected to suction filtration, and the collected crystal was washed with concentrated hydrochloric acid and then air-dried to obtain 35.8 g of tetrafluoroisophthalic acid.

15.0 Grams of tetrafluoroisoisophthalic acid, 45 ml of thionyl chloride and 0.5 ml of dried DMF were charged in a reaction vessel, and their reaction was carried out at 60° C. for 2 hours in a nitrogen atmosphere. After completion of the reaction, the excess thionyl chloride was distilled off by heating under reduced pressure. The residue was subjected to distillation under reduced pressure to obtain 11.4 g of tetrafluoroisophthalic acid chloride.

Examples of Polybenzoxazole Precursors and Polybenzoxazole Resins

EXAMPLE 1

9.04 Grams (0.02 mol) of 4,4'-diamino-3,3'-dihydroxy-5, 5'-dipentafluoroethylbiphenyl was charged in a separable flask equipped with a stirrer, a nitrogen introducing pipe and a dropping funnel, and dissolved in 100 g of dried N-methylpyrrolidone (hereinafter referred to as "NMP").

Then, 3.96 g (0.05 mol) of dried pyridine was added to the solution, followed by adding dropwise thereto a solution comprising 8.58 g (0.02 mol) of 4,4'-hexafluoroisopropylidenediphenyl-1,1'-dicarboxylic acid chloride obtained in Preparation Example 1 and 50 g of dried NMP at 5° C. over 60 minutes. After completion of the addition, the temperature of the reaction mixture was restored to room temperature, followed by stirring the reaction mixture as it was for 5 hours. After completion of the reaction, the reaction mixture was added dropwise to 1500 ml of a solution comprising water and ethanol at 1:1, and the precipitate was collected and dried to obtain a polybenzoxazole precursor.

The resultant polybenzoxazole precursor had a number average molecular weight (Mn) of 27,000, which was calculated in terms of polystyrene using GPC manufactured by Toso Co., Ltd.

The resulting polybenzoxazole precursor was dissolved in NMP to obtain a varnish. The varnish was coated on a glass sheet by a doctor blade having a gap of 300 μm. Then, this was dried at 70° C. for 1 hour in an oven, and the coating was peeled off to obtain a polybenzoxazole precursor film of 20 μm in thickness. This film was fixed by a metal frame and heated at 150° C. for 30 minutes, 250° C. for 30 minutes and 350° C. for 30 minutes successively in this order under nitrogen atmosphere to obtain a polybenzoxazole resin.

Dielectric constant of this test film was 2.4, which was measured in accordance with JIS-K6911 at a frequency of 1 MHz by use of HP-4284A Precision LCR meter made by Hewlett-Packard Co., Ltd. Glass transition point evaluated by TMA (Thermal Mechanical Analysis) was 401° C.

EXAMPLE 2

A polybenzoxazole precursor and a polybenzoxazole resin were prepared in the same manner as in Example 1, except that 8.30 g (0.02 mol) of 2,2'-bistrifluoromethyl-4,4'-biphenylenedicarboxylic acid chloride obtained in Preparation Example 2 was used in place of 8.58 g (0.02 mol) of 4,4'-hexafluoroisopropylidenediphenyl-1,1'-dicarboxylic acid chloride used in Example 1. Evaluation was conducted in the same manner as in Example 1 to obtain a dielectric constant of 2.5 and a glass transition point higher than 500° C. The number average molecular weight (Mn) of the resultant polybenzoxazole precursor was 28,000.

EXAMPLE 3

A polybenzoxazole precursor and a polybenzoxazole resin were prepared in the same manner as in Example 1, except that 7.04 g (0.02 mol) of 3,3'-diamino-4,4'-dihydroxy-5,5'-ditrifluoromethylbiphenyl was used in place of 9.04 g (0.02 mol) of 4,4'-diamino-3,3'-dihydroxy-5,5'-dipentafluoroethylbiphenyl used in Example 1 and 5.50 g (0.02 mol) of tetrafluoroisophthalic acid chloride obtained in Preparation Example 3 was used in place of 8.58 g (0.02 mol) of 4,4'-hexafluoroisopropylidenediphenyl-1,1'-dicarboxylic acid chloride used in Example 1. Similarly to Example 1 evaluation was conducted to obtain a dielectric constant of 2.5 and a glass transition point of 429° C. The resultant polybenzoxazole precursor had a number average molecular weight (Mn) of 21,000.

EXAMPLE 4

A polybenzoxazole precursor and a polybenzoxazole resin were prepared in the same manner as in Example 1, except that 8.86 g (0.018 mol) of 4,4'-diamino-3,3'-dihydroxy-5,5'-dipentafluoroethylbiphenyl and 0.432 g (0.002 mol) of 3,3'-diamino-4,4'-dihydroxybiphenyl were used in place of 9.04 g (0.02 mol) of 4,4'-diamino-3,3'-dihydroxy-5,5'-dipentafluoroethylbiphenyl used in Example 1. Similarly to Example 1 evaluation was conducted to obtain a dielectric constant of 2.6 and a glass transition point of 405° C. The resultant polybenzoxazole precursor had a number average molecular weight (Mn) of 27,000.

EXAMPLE 5

3.52 Grams (0.02 mol) of 1,3-diamino-4,6-dihydroxydifluorobenzene was dissolved in 100 g of dried dimethylacetamide in a separable flask equipped with a stirrer, a nitrogen introducing pipe and a dropping funnel, and 3.96 g (0.05 mol) of pyridine was added to the solution, followed by adding dropwise thereto a solution of 8.58 g (0.02 mol) of 4,4'-hexafluoroisopropylidenediphenyl-1,1'-dicarboxylic acid chloride obtained in Preparation Example 1 in 50 g of dimethylacetamide at −15° C. over 30 minutes under introduction of dried nitrogen. After completion of the addition, the temperature was restored to room temperature, followed by stirring at room temperature for 5 hours. Thereafter, the reaction mixture was added dropwise to 1000 ml of distilled water, and the precipitate was collected and dried to obtain a polybenzoxazole precursor. The resultant polybenzoxazole precursor had a number average molecular weight (Mn) of 22,000.

A polybenzoxazole resin film was obtained from the resulting polybenzoxazole precursor in the same manner as in Example 1. Similarly to Example 1 this was evaluated to obtain a dielectric constant of 2.5 and a glass transition point of 410° C.

EXAMPLE 6

A polybenzoxazole precursor and a polybenzoxazole resin were prepared in the same manner as in Example 5, except that 4.16 g (0.02 mol) of 1-trifluoromethyl-2,5-diamino-3,6-dihydroxybenzene was used in place of 3.52 g (0.02 mol) of 1,3-diamino-4,6-dihydroxydifluorobenzene used in Example 5 and 5.42 g (0.02 mol) of tetrafluoroisophthalic acid chloride obtained in Preparation Example 3 was used in place of 8.58 g (0.02 mol) of 4,4'-hexafluoroisopropylidenediphenyl-1,1'-dicarboxylic acid chloride used in Example 5. Similarly to Example 5 evaluation was conducted to obtain a dielectric constant of 2.5 and a glass transition point of 412° C. The resultant polybenzoxazole precursor had a number average molecular weight (Mn) of 19,000.

EXAMPLE 7

A polybenzoxazole precursor and a polybenzoxazole resin were prepared in the same manner as in Example 5, except that 3.52 g (0.02 mol) of 1,4-diamino-2,3-dihydroxydifluorobenzene was used in place of 3.52 g (0.02 mol) of 1,3-diamino-4,6-dihydroxydifluorobenzene used in Example 5. Similarly to Example 5 evaluation was conducted to obtain a dielectric constant of 2.6 and a glass transition point of 410° C. The resultant polybenzoxazole precursor had a number average molecular weight (Mn) of 20,000.

EXAMPLE 8

A polybenzoxazole precursor and a polybenzoxazole resin were prepared in the same manner as in Example 5, except that 4.97 g (0.018 mol) of 1,4-bis(trifluoromethyl)-

2,5-diamino-3,6-dihydroxybenzene and 0.432 g (0.002 mol) of 3,3'-diamino-4,4'-dihydroxybiphenyl were used in place of 3.52 g (0.02 mol) of 1,3-diamino-4,6-dihydroxydifluorobenzene used in Example 5. Similarly to Example 5 evaluation was conducted to obtain a dielectric constant of 2.6 and a glass transition point of 415° C. The resultant polybenzoxazole precursor had a number average molecular weight (Mn) of 20,000.

EXAMPLE 9

5.24 Grams (0.02 mol) of 2,7-diamino-3,6-dihydroxytetrafluoronaphthalene was dissolved in 100 g of dried dimethylacetamide in a separable flask equipped with a stirrer, a nitrogen-introducing pipe and a dropping funnel, and 3.96 g (0.05 mol) of pyridine was added to the solution, followed by adding dropwise thereto a solution of 8.58 g (0.02 mol) of 4,4'-hexafluoroisopropylidenediphenyl-1,1'-dicarboxylic acid chloride obtained in Preparation Example 1 in 50 g of dimethylacetamide at −15° C. over 30 minutes under introduction of dried nitrogen. After completion of the addition, the temperature was restored to room temperature, followed by stirring at room temperature for 5 hours. Thereafter, the reaction mixture was added dropwise to 1000 ml of distilled water, and the precipitate was collected and dried to obtain a polybenzoxazole precursor. The resultant polybenzoxazole precursor had a number average molecular weight (Mn) of 25,000.

A polybenzoxazole resin film was obtained from the resulting polybenzoxazole precursor in the same manner as in Example 1.

This test film was evaluated to obtain a dielectric constant of 2.6 and a glass transition point of 419° C.

EXAMPLE 10

A polybenzoxazole precursor and a polybenzoxazole resin were prepared in the same manner as in Example 9, except that 6.52 g (0.02 mol) of 1,5-bis(trifluoromethyl)-3,7-diamino-2,6-dihydroxynaphthalene was used in place of 5.24 g (0.02 mol) of 2,7-diamino-3,6-dihydroxytetrafluoronaphthalene used in Example 9 and 5.42 g (0.02 mol) of tetrafluoroisophthalic acid chloride obtained in Preparation Example 3 was used in place of 8.58 g (0.02 mol) of 4,4'-hexafluoroisopropylidenediphenyl-1,1'-dicarboxylic acid chloride used in Example 9. Evaluation was conducted to obtain a dielectric constant of 2.5 and a glass transition point of 422° C. The resultant polybenzoxazole precursor had a number average molecular weight (Mn) of 23,000.

EXAMPLE 11

A polybenzoxazole precursor and a polybenzoxazole resin were prepared in the same manner as in Example 9, except that 7.24 g (0.02 mol) of 1,5-bis(trifluoromethyl)-3,7-diamino-2,6-dihydroxydifluoronaphthalene was used in place of 5.24 g (0.02 mol) of 2,7-diamino-3,6-dihydroxytetrafluoro-naphthalene used in Example 9. Similarly to Example 9 evaluation was conducted to obtain a dielectric constant of 2.4 and a glass transition point of 416° C. The resultant polybenzoxazole precursor had a number average molecular weight (Mn) of 26,000.

EXAMPLE 12

A polybenzoxazole precursor and a polybenzoxazole resin were prepared in the same manner as in Example 9, except that 8.32 g (0.018 mol) of 1,4,5,8-tetra (trifluoromethyl)-2,7-diamino-3,6-dihydroxynaphthalene and 0.432 g (0.002 mol) of 3,3'-diamino-4,4'-dihydroxybiphenyl were used in place of 5.24 g (0.02 mol) of 2,7-diamino-3,6-dihydroxytetrafluoronaphthalene used in Example 9. Similarly to Example 9 evaluation was conducted to obtain a dielectric constant of 2.4 and a glass transition point of 418° C. The resultant polybenzoxazole precursor had a number average molecular weight (Mn) of 27,000.

Preparation Examples of Acid Chlorides

Preparation Example 4

25 Grams of 1,3,4,5,7,8-hexafluoronaphthalene-2,6-dicarboxylic acid, 45 ml of thionyl chloride and 0.5 ml of dried dimethylformamide were charged in a reaction vessel, and their reaction was carried out at 600° C. for 2 hours. After completion of the reaction, the excess thionyl chloride was distilled off by heating under reduced pressure. The residue was recrystallized using hexane to obtain 15 g of 1,3,4,5,7,8-hexafluoronaphthalene-2,6-dicarboxylic acid chloride.

Preparation Example 5

13 Grams of 1,5-bis(trifluoromethyl)-naphthalene-3,7-dicarboxylic acid chloride was obtained in the same manner as in Preparation Example 4, except that 25 g of 1,5-bis(trifluoromethyl)naphthalene-3,7-dicarboxylic acid was used in place of 25 g of 1,3,4,5,7,8-hexafluoronaphthalene-2,6-dicarboxylic acid used in Preparation Example 4.

Preparation Example 6

18 Grams of 1,5-bis(trifluoromethyl)-2,4,6,8-tetrafluoronaphthalene-3,7-dicarboxylic acid chloride was obtained in the same manner as in Preparation Example 4, except that 30 g of 1,5-bis(trifluoromethyl)-2,4,6,8-tetrafluoronaphthalene-3,7-dicarboxylic acid was used in place of 25 g of 1,3,4,5,7,8-hexafluoronaphthalene-2,6-dicarboxylic acid used in Preparation Example 4.

Preparation Example 7

24 Grams of 1,5-bis[bis(trifluoromethyl)methoxy]-2,4,6,8-tetrafluoronaphthalene-3,7-dicarboxylic acid chloride was obtained in the same manner as in Preparation Example 4, except that 35 g of 1,5-bis[bis(trifluoromethyl)methoxy]-2,4,6,8-tetrafluoronaphthalene-3,7-dicarboxylic acid was used in place of 25 g of 1,3,4,5,7,8-hexafluoronaphthalene-2,6-dicarboxylic acid used in Preparation Example 4.

Examples of Polybenzoxazole Precursors and Polybenzoxazole Resins

EXAMPLE 13

7.32 Grams (0.02 mol) of 2,2-bis(3-amino-4-hydroxyphenyl)hexafluoropropane was dissolved in 100 g of dried dimethylacetamide in a separable flask equipped with a stirrer, a nitrogen-introducing pipe and a dropping funnel, and 3.96 g (0.05 mol) of pyridine was added to the solution, followed by adding dropwise thereto a solution of 7.22 g (0.02 mol) of 1,3,4,5,7,8-hexafluoronaphthalene-2,6-dicarboxylic acid chloride obtained in Preparation Example 4 in 50 g of dimethylacetamide at −15° C. over 30 minutes under introduction of dried nitrogen. After completion of the addition, the temperature was restored to room temperature, followed by stirring at room temperature for 5 hours. Thereafter, the reaction mixture was added dropwise to 1000 ml of distilled water, and the precipitate was collected and dried to obtain a polybenzoxazole precursor. The resultant polybenzoxazole precursor had a number average molecular weight (Mn) of 25,000.

A polybenzoxazole resin film was obtained from the resulting polybenzoxazole precursor in the same manner as in Example 1.

This test film was evaluated to obtain a dielectric constant of 2.5 and a glass transition point of 408° C.

EXAMPLE 14

A polybenzoxazole precursor and a polybenzoxazole resin were prepared in the same manner as in Example 13, except that 10.89 g (0.02 mol) of 4,4'-bis(3-amino-4-hydroxyphenoxy)octafluorobiphenyl was used in place of 7.32 g (0.02 mol) of 2,2-bis(3-amino-4-hydroxyphenyl)hexafluoropropane used in Example 13 and 7.78 g (0.02 mol) of 1,5-bis(trifluoromethyl)naphthalene-3,7-dicarboxylic acid chloride obtained in Preparation Example 5 was used in place of 7.22 g (0.02 mol) of 1,3,4,5,7,8-hexafluoronaphthalene-2,6-dicarboxylic acid chloride used in Example 13. Similarly to Example 13 evaluation was conducted to obtain a dielectric constant of 2.5 and a glass transition point of 417° C. The resultant polybenzoxazole precursor had a number average molecular weight (Mn) of 25,000.

EXAMPLE 15

A polybenzoxazole precursor and a polybenzoxazole resin were prepared in the same manner as in Example 13, except that 10.89 g (0.02 mol) of 4,4'-bis(3-amino-4-hydroxyphenoxy)octafluorobiphenyl was used in place of 7.32 g (0.02 mol) of 2,2-bis(3-amino-4-hydroxyphenyl)hexafluoropropane used in Example 13 and 9.22 g (0.02 mol) of 1,5-bis(trifluoromethyl)-2,4,6,8-tetrafluoronaphthalene-3,7-dicarboxylic acid chloride obtained in Preparation Example 6 was used in place of 7.22 g (0.02 mol) of 1,3,4,5,7,8-hexafluoronaphthalene-2,6-dicarboxylic acid chloride used in Example 13. Similarly to Example 13 evaluation was conducted to obtain a dielectric constant of 2.4 and a glass transition point of 414° C. The resultant polybenzoxazole precursor had a number average molecular weight (Mn) of 24,000.

EXAMPLE 16

A polybenzoxazole precursor and a polybenzoxazole resin were prepared in the same manner as in Example 13, except that 10.89 g (0.02 mol) of 4,4'-bis(3-amino-4-hydroxyphenoxy)octafluorobiphenyl was used in place of 7.32 g (0.02 mol) of 2,2-bis(3-amino-4-hydroxyphenyl)hexafluoropropane used in Example 13, and 11.17 g (0.017 mol) of 1,5-bis[bis(trifluoromethyl)methoxy]-2,4,6,8-tetrafluoronaphthalene-3,7-dicarboxylic acid chloride obtained in Preparation Example 7 and 1.25 g (0.003 mol) of 2,2'-bis(trifluoromethyl)-4,4'-biphenylenedicarboxylic acid chloride obtained in Preparation Example 2 were used in place of 7.22 g (0.02 mol) of 1,3,4,5,7,8-hexafluoronaphthalene-2,6-dicarboxylic acid chloride used in Example 13. Similarly to Example 13 evaluation was conducted to obtain a dielectric constant of 2.3 and a glass transition point of 407° C. The resultant polybenzoxazole precursor had a number average molecular weight (Mn) of 24,000.

Comparative Example 1

A polybenzoxazole precursor and a polybenzoxazole resin were prepared in the same manner as in Example 1, except that 4.32 g (0.02 mol) of 3,3'-diamino-4,4'-dihydroxybiphenyl was used in place of 9.04 g (0.02 mol) of 4,4'-diamino-3,3'-dihydroxy-5,5'-dipentafluoroethylbiphenyl used in Example 1. Similarly to Example 1 evaluation was conducted to obtain a dielectric constant of 2.8 and a glass transition point of 453° C. The resultant polybenzoxazole precursor had a number average molecular weight (Mn) of 23,000.

Comparative Example 2

A polybenzoxazole precursor and a polybenzoxazole resin were prepared in the same manner as in Example 13, except that 8.58 g (0.02 mol) of 4,4'-hexafluoroisopropylidenediphenyl-1,1'-dicarboxylic acid chloride obtained in Preparation Example 1 was used in place of 7.22 g (0.02 mol) of 1,3,4,5,7,8-hexafluoronaphthalene-2,6-dicarboxylic acid chloride used in Example 13. Similarly to Example 13 evaluation was conducted to obtain a dielectric constant of 2.7 and a glass transition point of 364° C. The resultant polybenzoxazole precursor had a number average molecular weight (Mn) of 25,000.

Comparative Example 3

4.00 Grams (0.02 mol) of 4,4'-diaminodiphenyl ether was dissolved in 150 g of dried N-methyl-2-pyrrolidone in a separable flask having a stirrer, a nitrogen-introducing pipe and an opening for introduction of starting materials. The solution was cooled to 10° C. and 4.36 g of pyromellitic acid dianhydride was introduced thereinto in dried nitrogen. After 5 hours from the introduction, the temperature was restored to room temperature, followed by stirring at room temperature for 2 hours to obtain a polyimide precursor solution. The resultant polyimide precursor had a number average molecular weight (Mn) of 25,000.

This polyimide precursor solution was filtered by a Teflon filter having a pore diameter of 0.2 $\mu$m to obtain a varnish.

This varnish was coated on a glass sheet by a doctor blade having a gap of 300 $\mu$m. Then, this was dried at 70° C. for 1 hour in an oven, and the coating was peeled off to obtain a polyimide precursor film of 20 $\mu$m in thickness. This film was fixed by a metal frame and heated at 150° C. for 30 minutes, 250° C. for 30 minutes and 350° C. for 30 minutes successively in this order in a nitrogen atmosphere to obtain a polyimide resin.

This polyimide resin was evaluated in the same manner as in Example 1 to obtain a dielectric constant of 3.5 and a glass transition point of 417° C.

The polybenzoxazole resins of Examples 1–16 which were prepared using the polybenzoxazole precursors of the present invention all had a low dielectric constant of 2.3–2.6 and a high glass transition point of 401–500° C. or higher. Thus, they had good characteristics.

In Comparative Example 1, a polybenzoxazole resin was obtained, but the resin had no recurring units of the present invention. Therefore, the resin showed only a high dielectric constant of 2.8 although it had a good high glass transition point. In Example 2 the resin was lower in glass transition point than those of Examples, and a glass transition point higher than 400° C. was not obtained.

In Comparative Example 3, since a polyimide resin was prepared using a polyimide precursor, the glass transition point was high and satisfactory, but only a high dielectric constant of 3.5 was obtained.

As can be seen from the above, the polybenzoxazole resins of the present invention are excellent in electric characteristics and heat resistance and are useful polymer materials for various uses requiring these characteristics, such as layer insulation films and protective films for semiconductors, layer insulation films of multilayer circuits, cover coats of flexible copper-clad sheets, solder resist films, liquid crystal-aligned films, etc.

What is claimed is:

1. A polybenzoxazole precursor having recurring units represented by the following general formula (1):

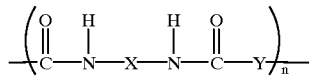

(1)

wherein n denotes an integer of 1–1000, X is selected from bivalent aromatic groups represented by the following general formulas (2)–(4) each having two OR groups (Rs each denotes H or a monovalent organic group and may be the same or different), the amide group in the formula (1) and the OR group respectively bond to the adjacent carbon atoms of the aromatic group, and Y denotes a bivalent organic group containing fluorine:

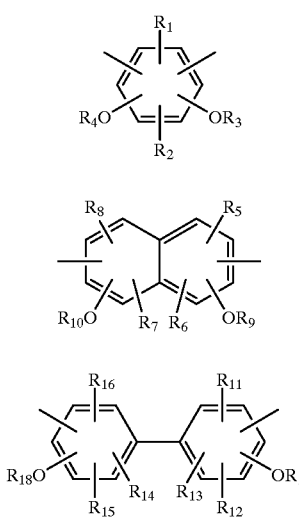

(2)

(3)

(4)

wherein $R_1$, $R_5$ and $R_{11}$ each denotes F or a monovalent organic group containing fluorine, $R_2$, $R_6$, $R_7$, $R_8$, $R_{12}$, $R_{13}$, $R_{14}$, $R_{15}$ and $R_{16}$ each denotes H, F or a monovalent organic group containing fluorine and may be the same or different, and $R_3$, $R_4$, $R_9$, $R_{10}$, $R_{17}$ and $R_{18}$ each denotes H or a monovalent organic group and may be the same or different.

2. A polybenzoxazole resin having a structure obtained by cyclizing the polybenzoxazole precursor of claim 1.

3. A polybenzoxazole precursor having recurring units represented by the following general formula (1):

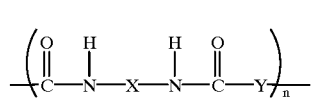

(1)

wherein n denotes an integer of 1–1000, Y is selected from bivalent aromatic groups represented by the following general formulas (5)–(7), X denotes a bivalent aromatic group containing fluorine and having two OR groups (Rs each denotes H or a monovalent organic group and may be the same or different), and the amide group in the formula (1) and the OR group respectively bond to the adjacent carbon atoms of the aromatic group:

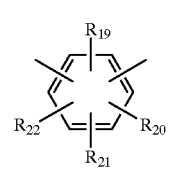

(5)

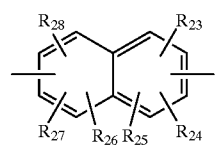

(6)

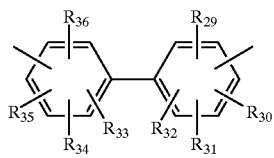

(7)

wherein $R_{19}$, $R_{23}$ and $R_{29}$ each denotes F or a monovalent organic group containing fluorine, and $R_{20}$, $R_{21}$, $R_{22}$, $R_{24}$, $R_{25}$, $R_{26}$, $R_{27}$, $R_{28}$, $R_{30}$, $R_{31}$, $R_{32}$, $R_{33}$, $R_{34}$, $R_{35}$ and $R_{36}$ each denotes H, F or a monovalent organic group containing the same or different.

4. A polybenzoxazole resin having a structure obtained by cycling the polybenzoxazole precursor of claim 3.

* * * * *